March 30, 1965  K. B. BREDTSCHNEIDER  3,175,802
RENEWABLE SEAT RING
Filed Nov. 19, 1962
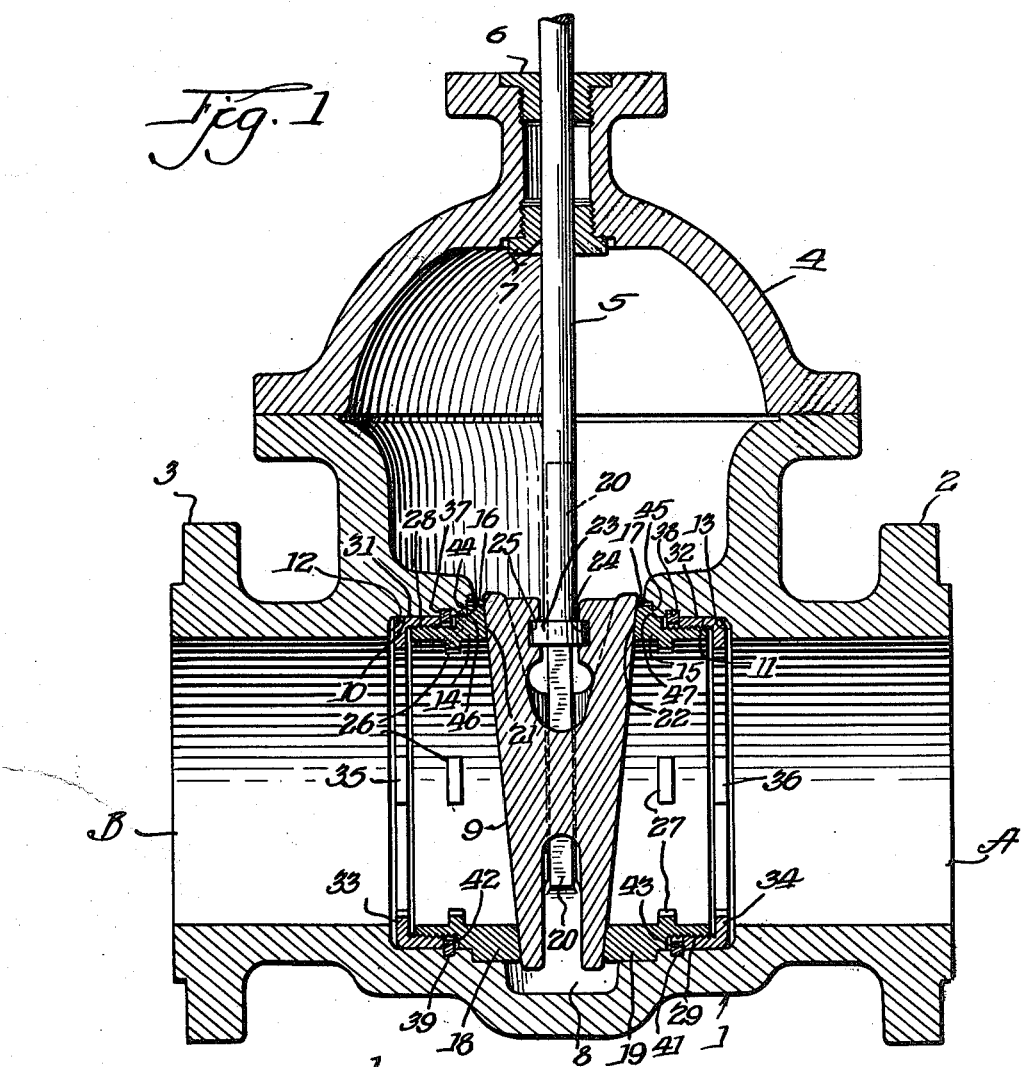
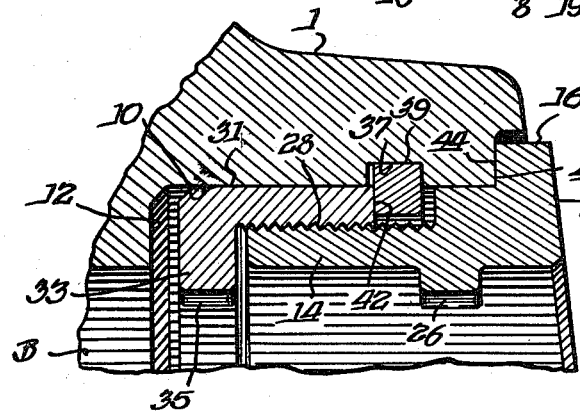
Inventor.
Kurt B. Bredtschneider.
By Joseph O. Lange
Atty.

United States Patent Office 3,175,802
Patented Mar. 30, 1965

3,175,802
RENEWABLE SEAT RING
Kurt B. Bredtschneider, Chicago, Ill., assignor to Crane Co., Chicago, Ill., a corporation of Illinois
Filed Nov. 19, 1962, Ser. No. 238,491
3 Claims. (Cl. 251—328)

This invention relates generally to valves or the like. More particularly, it is concerned with a novel type of seat ring suitable for valves, pumps, or other types of pressure vessels, in which valve seats are useful.

At the outset and in order to have a better appreciation of the benefits of this invention, it should be realized that at the present time in such pressure vessels wherein frequently relatively higher temperatures must be taken into consideration, the valve seat rings are threadedly attached, rolled-in or welded to the valve body. As an illustration, such constructions are shown in Crane Co.'s No. 60 Catalog, pages 123, 117 and 165, respectively. However, it must be realized that when seat rings are threaded into a valve body, the matter of replacement becomes a serious problem, particularly when the seat rings must be entirely replaced because of their being exposed to corrosive fluids, and in such cases, the reconditioning of the threaded area of the valve body becomes necessary before the replacement seat ring is installed. This is obviously a relatively difficut and costly problem. The shut-down of a pipe line can also be a very serious matter where expensive processing is involved, for example. In many cases, as, for example, in gate valves having tapered valve seats, such as those known as a wedge gate valve, it is often desirable to insert the valve seat rings in a bore concentric to the valve axis and in such case threading of the valve body is virtually impossible. In such cases, the seat rings have to be welded-in or rolled-in and are very difficult therefore to replace. The attachment of a seat ring by means of welding is often prohibitive, realizing that a valve body in many cases may be of a non-weldable material or the valve seat rings may be fitted with plastic inserts which from a practical standpoint cannot be exposed to the higher temperatures associated with the welding operation.

Therefore, it is one of the more important objects of this invention to provide for relatively easily removable seat rings and thereby eliminating welding and rolling-in of the seat rings as well as eliminating the necessity for threading of the valve body to accommodate the seat ring.

Other objects and advantages of this invention will become more readily apparent upon proceeding with the following description read in light of the accompanying drawings, in which:

FIG. 1 is a fragmentary sectional assembly view of a wedge gate valve embodying seat rings of this invention; and FIG. 2 is a magnified fragmentary sectional view of the novel seat ring assembly forming the basis of this invention.

Referring now to FIG. 1, a valve body generally designated 1 is provided with the usual connecting ends 2 and 3 for attachment to a pipe line (not shown). In the upper end portion of the valve casing 1, a conventional valve bonnet 4 is shown, serving as the journalling means for the valve stem 5 and provided with the usual bushings 6 and 7 for journalling the said valve stem, which, in this case is reciprocally movable and non-rotatable. Obviously, other methods of effecting such actuation may be employed without interferring with the use of the seat rings as hereinafter described.

The valve casing 1 is provided at its central portion with a valve chamber designated 8. The valve chamber receives a closure or disc member 9, which, for effecting valve seat tightness in the closed position of the valve, must necessarily be provided with valve seats.

In this particular case, the outer limits of the valve chamber 8 are defined by means of end disposed recesses 10 and 11, having their outer limits established by shouldered portions in the casing designated at 12 and 13 respectively. The valve closure 9 normally in the closed position as indicated bears against inner annular shoulder members commonly known as body seat rings and designated 14 and 15 having the outer shoulders as at 16 and 17. The latter portions in order to receive the wedge closure member 9 are thickened or made of greater width at their lower annular portions as at 18 and 19 respectively, and being provided with the annular seat contact surfaces on said shoulder portions as indicated at 21 and 22. The usual connection between the closure member which is reciprocally movable is made by means of a T-head 23 on the stem 5, engageable at portions 24 and 25. For guiding the said reciprocal movement of the closure member 9, the valve casing is provided with the rib 20 for purpose of aligning the closure member with the central axis of the valve in the course of said movement. The body seat rings 14 and 15 are preferably, but not necessarily, provided on their inner portion with the lugs 26 and 27 for effecting suitable rotation or gripping of the respective members 14 and 15 during the course of their positioning at the proper point of rotation with respect to the fluid sealing contact surfaces with the closure member 9. The body seat rings 14 and 15 are threaded as at 28 and 29 for the purpose of providing adequate threaded engagement with the annular members or retaining rings designated 31 and 32 respectively. The latter retaining rings having inturned annular flanged portions as indicated at 33 and 34, and, preferably, although not necessarily, may also be provided with suitable lugs 35 and 36 for engagement by wrenches or other gripping means in the course of making the assembly. For purpose of alignment of the retaining rings 31 and 32 with the body ports A and B, the said rings are preferably fitted relatively snugly within the respective body recesses 10 and 11, although it will be appreciated that under certain conditions such fit need not necessarily be close. However, it should be noted that the respective casing recesses 10 and 11 are provided at an intermediate portion thereof with annular recesses designated 37 and 38 for receiving the split or segmental ring members 39 and 41. It will be appreciated that the latter members are sometimes termed "snap rings." By virtue of the inherent resilience of the material of which they are made, they will when compressed slightly due to their being split spring outwardly and thereby engage the respective recesses 37 and 38. In this way, they serve as holding members interposed between threaded shank portions of the seat members 14 and 15 and inner end annular surfaces 42 and 43 for purposes hereinafter to be explained.

As previously stated, the assembly comprising the body seat rings of this invention consists of two annular members in telescoped relationship, one having outside threads and the other being internally threaded to receive said outside threads. Thus, it will be clear that as the members 14 and 15 are positioned properly, it only becomes necessary for the members 31 and 32 to be rotated and to bear against the split rings 39 and 41 to serve as the means whereby shoulders are created not only at the surfaces 42 and 43 with the inner end annular surfaces of the outer rings 31 and 32, but of greater importance, the undersurfaces respectively designated 44 and 45 make fluid sealing contacts with the recessed surfaces of the casing as designated at 46 and 47. This is of course necessary in order to make certain that line fluid within the chamber 8 at no time can escape past the sealing contact made at this location. Of course, while a metal-to-metal contact is indicated, if desired, certain types of gaskets might be employed under special conditions without departing from the function of the telescoped members in their attachment to the respective body seat rings in the peripheral portion of the valve ports designated A and B. Thus, as the shoulder portions 16 and 17 of the respective seat rings engage the undercut portions 46 and 47 of the valve body, as indicated, they are held against substantial axial movement by means of the respective split rings 39 and 41 and the externally threaded seat ring members with shoulders seating against the valve body to engage the threads of the internally threaded sleeve-like outer members 31 and 32. It will now become apparent that by rotating the said sleeve-like members 31 and 32, while the seat rings 14 and 15 are held in fixed seating positions, the respective sleeves contact the split rings 39 and 41 as shown and thereby draw the respective seat ring shoulders 44 and 45 tightly to form a fluid seal with the respective casing surfaces 46 and 47.

On tapered wedge gate valves, such as that illustrated, the valve closure member 9 is of course positioned previously from above and thereby holds the respective seat rings 14 and 15 in position as shown, while the sleeves 31 and 32 are being rotated and thereby draw the said seat rings tightly against the valve body for the reasons hereinabove explained. It will thus be apparent that there is no necessity here for resorting to the relative expensive and inconvenient welding, rolling-in, or threading-in operations as heretofore employed when mounting valve seat rings in a valve body. Thus costly pipe line shutdowns are easily avoided by merely removing with suitable snap-ring tools the said split rings after the threaded rings 14 and 15 have been previously removed. A new assembly is then inserted, and the reseated valve is now ready for use.

While the above description has been restricted to the embodiment of the seat rings of this invention to a wedge gate valve, it will of course be understood by those skilled in the art that these seat rings may equally be used advantageously in globe valves, angle valves, parallel seat gate valves, conduit valves, check valves, and the like, including pumps and other pressure vessels where ready renewable valve seats are desirable.

It will, therefore, be appreciated that while only a single embodiment has been illustrated and described, this is only for purpose of example and not limitation.

I claim:
1. In a renewable seat ring assembly for valves or the like, the combination of a ported valve body with an annular recess within the body port;
   a body seat ring normally positioned in shouldered relation in said annular recess, the said seat ring comprising a pair of telescopically arranged relatively rotatable annular members received within said body recess and being joined by interlocking threads thereon to effect said shouldered relation of said body seat ring;
   the inner one of said annular members having an intermediate enlarged portion defining the inner end limit of the interlocking threads;
   said body recess having an intermediate annular groove;
   split ring means disposed in said intermediate annular groove of the said body recess with an inner peripheral portion of said split ring means projecting inwardly within the said body recess;
   said split ring means being mounted between an outer end of said intermediate enlarged portion of the inner one of said telescoped annular members and an annular projection on the other of said telescoped annular members;
   one of said annular members providing the seat contact for the said closure member, the other annular member serving as retaining means for the first named annular member and enclosing the threads of the said first named annular member in said telescoped arrangement;
   the said split ring means forming a stop to limit the axial movement of the telescoped annular member serving as said retaining means;
   the said telescoped annular seat contact member having an annular shoulder portion for engagement with an annular edge of the body recess to provide a fluid sealing contact between said latter telescoped member and said body recess annular edge upon predetermined rotation of at least one of said telescoped members.

2. The subject matter of claim 1, the said annular member serving as said retaining means having an inturned annular flanged portion substantially enclosing an end portion of said annular member providing the seat contact for the said closure member.

3. The subject matter of claim 1, the interlocking threads of the annular member providing the seat contact for the closure member being of a length sufficient to threadedly engage substantially the full length of threads of the said annular member serving as retaining means and simultaneously receiving the said split ring means.

References Cited by the Examiner

UNITED STATES PATENTS 2,330,610  9/43  Natter _____ 251—360

FOREIGN PATENTS 9,822  1889  Great Britain.
18,269  1902  Great Britain.

MARTIN P. SCHWADRON, *Primary Examiner.*

LAVERNE D. GEIGER, *Examiner.*